United States Patent
Kwon et al.

(10) Patent No.: US 12,058,615 B2
(45) Date of Patent: Aug. 6, 2024

(54) DEVICE AND METHOD FOR MULTI-LINK COMMUNICATIONS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 358 days.

(21) Appl. No.: 17/510,222

(22) Filed: Oct. 25, 2021

(65) Prior Publication Data

US 2022/0132419 A1   Apr. 28, 2022

Related U.S. Application Data

(60) Provisional application No. 63/138,638, filed on Jan. 18, 2021, provisional application No. 63/104,727, filed on Oct. 23, 2020.

(51) Int. Cl.
*H04W 52/02* (2009.01)
*H04W 48/10* (2009.01)
*H04W 84/12* (2009.01)

(52) U.S. Cl.
CPC ....... *H04W 52/0216* (2013.01); *H04W 48/10* (2013.01); *H04W 84/12* (2013.01)

(58) Field of Classification Search
CPC .. H04W 52/0216; H04W 46/10; H04W 84/12
See application file for complete search history.

(56) References Cited

U.S. PATENT DOCUMENTS

2021/0153125 A1* 5/2021 Cariou ............. H04W 52/0235
2021/0321243 A1* 10/2021 Patil ..................... H04W 48/10

OTHER PUBLICATIONS

Wentink, Menzoet al. "Normative Text for TIM Broadcast", IEEE 802.11-07/671r1, Mar. 2007, 5 pgs.
Cariou, Laurent et al., "CSA/eCSA within AP MLD", IEEE 802.11-20/1140r0, Jul. 27, 2020, 7 pgs.
Hu, Chunyu et al. "Prioritized EDCA Channel Access", IEEE 802.11-20/1045r0, Jul. 29, 2020, 10 pgs.
Wentink, Menzo et al. "Normative Text for TIM Broadcast", IEEE 802.11-071671r1, Mar. 2007, 5 pgs.
IEEE SA, "Part 11: Wireless LAN Medium Access Control (MAC) and Physical Layer (PHY) Specifications", IEEE std.802.11-2020, Section 11.2.3.15, downloaded Jun. 21, 2021, 152 pgs.

* cited by examiner

*Primary Examiner* — Mohammad S Anwar (57) ABSTRACT

Embodiments of a device and a method for multi-link communications are disclosed. In an embodiment, a device includes a processor configured to identify that an update event has occurred on a first link of an access point (AP) multi-link device (MLD), and transmit a management frame on a second link, where the management frame includes a Change Sequence field and a multi-link (ML) element that indicates the update event.

21 Claims, 10 Drawing Sheets

| REQUEST TYPE 802 | TWT 804 | NOMINAL MINIMUM TWT WAKE DURATION 806 | TWT WAKE INTERVAL MANTISSA 808 | BROADCAST TWT INFO 810 |
|---|---|---|---|---|
| 2 | 2 | 1 | 2 | 2 |

OCTETS:

DEVICE AND METHOD FOR MULTI-LINK COMMUNICATIONS

CROSS-REFERENCE TO RELATED APPLICATIONS

This application is entitled to the benefit of U.S. Provisional Patent Application Ser. No. 63/104,727, filed on Oct. 23, 2020, and U.S. Provisional Patent Application Ser. No. 63/138,638, filed on Jan. 1, 2021, each of which is incorporated by reference herein.

BACKGROUND

In multi-link communications, wireless devices, e.g., access point (AP) multi-link devices (MLDs) or non-AP MLDs, e.g., station (STA) MLDs, can execute various wireless operations, such as coordinate some features or operations for devices in a multi-link operation via one or more links. As an example, frames may be exchanged between an AP MLD and a non-AP MLD on multiple links to communicate information corresponding to an event that may have occurred on one of the links, at the AP MLD, and/or at the non-AP MLD. However, because the information corresponding to the event is communicated on multiple links, multi-link communications may experience limited efficiency.

SUMMARY

Embodiments of a device and a method for multi-link communications are disclosed. In an embodiment, a device includes a processor configured to identify that an update event has occurred on a first link of an access point (AP) multi-link device (MLD), and transmit a management frame on a second link, where the management frame includes a Change Sequence field and a multi-link (ML) element that indicates the update event.

In an embodiment, the processor is configured to preserve a Change Sequence value included in the Change Sequence field during transmission of the management frame when the ML element includes at least one of a Channel Switch Announcement (CSA) element, an extended CSA (eCSA) element, a Quiet element, a Quiet Channel element, and an insertion of a Target Wake Time (TWT) element that includes a restricted access service period (SP).

In an embodiment, the processor is configured to increment a Check Beacon value included in a Check Beacon field of a Traffic Indication Map (TIM) frame transmitted by the AP MLD subsequent to the transmission of the management frame.

In an embodiment, the processor is configured to increment a Change Sequence value included in the Change Sequence field during transmission of the management frame when the ML element includes at least one of an Enhanced Distribution Channel Access (EDCA) Parameter Set element, a multi-user (MU) EDCA Parameter Set element, and an Operation element.

In an embodiment, the update event is for a first AP associated with the AP MLD on the first link, and where a second AP associated the AP MLD preserves a Change Sequence value included in the Change Sequence field of the management frame transmitted on the second link.

In an embodiment, the update event is for a first AP associated with the AP MLD on the first link, and where a Change Sequence value for the first AP is preserved.

In an embodiment, a first AP associated with the AP MLD includes scheduling information for a restricted SP, and where a second AP associated the AP MLD transmits the scheduling information for the restricted SP via the management frame on the second link.

In an embodiment, the scheduling information for the restricted SP is indicated by a TWT element included in the ML element of the management frame.

In an embodiment, the scheduling information is for non-AP stations (STAs) of a non-AP MLD associated with the AP MLD, and where a non-AP STA that is not scheduled by the scheduling information ends a Transmission Opportunity (TXOP) before the restricted SP.

In an embodiment, the scheduling information is for non-AP STAs of a non-AP MLD associated with the AP MLD, and where a non-AP STA that is scheduled by the scheduling information ends a TXOP before the restricted SP.

In an embodiment, the ML element includes a Quiet element that indicates a quiet interval during which a non-AP STA is not allowed to access a medium.

In an embodiment, the non-AP STA ignores the quiet interval when the quiet interval overlaps with a restricted SP, and where the non-AP STA is allowed to access the medium during the restricted SP.

In an embodiment, a first AP associated with the AP MLD on the first link identifies the update event, and where a second AP associated the AP MLD transmits the management frame on the second link.

In an embodiment, the update event is included in a per-STA profile sub-element of the ML element, and where the per-STA profile sub-element corresponds to an AP of the AP MLD.

In an embodiment, the management frame is at least one of a beacon frame and a probe response frame.

In an embodiment, the processor is configured to operate according to an Institute of Electrical and Electronics Engineers (IEEE) 802.11be communication protocol.

In an embodiment, the device is a wireless local area network (WLAN) device.

A method for multi-link communications is also disclosed. The method involves identifying, by an AP MLD, that an update event has occurred on a first link, and transmitting, by the AP MLD, a management frame on a second link, where the management frame includes a Change Sequence field and an ML element that indicates the update event.

In an embodiment, the method includes receiving, by a non-AP MLD from the AP MLD, the management frame on the second link, and operating the non-AP MLD according to the management frame received on the second link.

In an embodiment, operating the non-AP MLD includes identifying whether a non-AP STA associated with the non-AP MLD needs to monitor other management frames transmitted by the AP MLD.

Another method for multi-link communications is also disclosed. The method involves identifying, by an AP MLD, that an update event has occurred on a first link, transmitting, by the AP MLD to a non-AP MLD, a management frame on a second link, where the management frame includes a Change Sequence field and an ML element that indicates the update event, receiving, by the non-AP MLD from the AP MLD, the management frame on the second link, and operating the non-AP MLD according to the management frame received on the second link.

Other aspects in accordance with the invention will become apparent from the following detailed description,

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device may be, e.g., a wireless local area network (WLAN) device or an access point (AP) multi-link device (MLD) of a WLAN, and may exchange data with at least one associated non-AP MLD (e.g., a station (STA) MLD). In such an embodiment, the AP MLD may include one or more associated access points (APs) and the non-AP MLD may include one or more associated non-AP stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated non-AP STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

Figure 1:
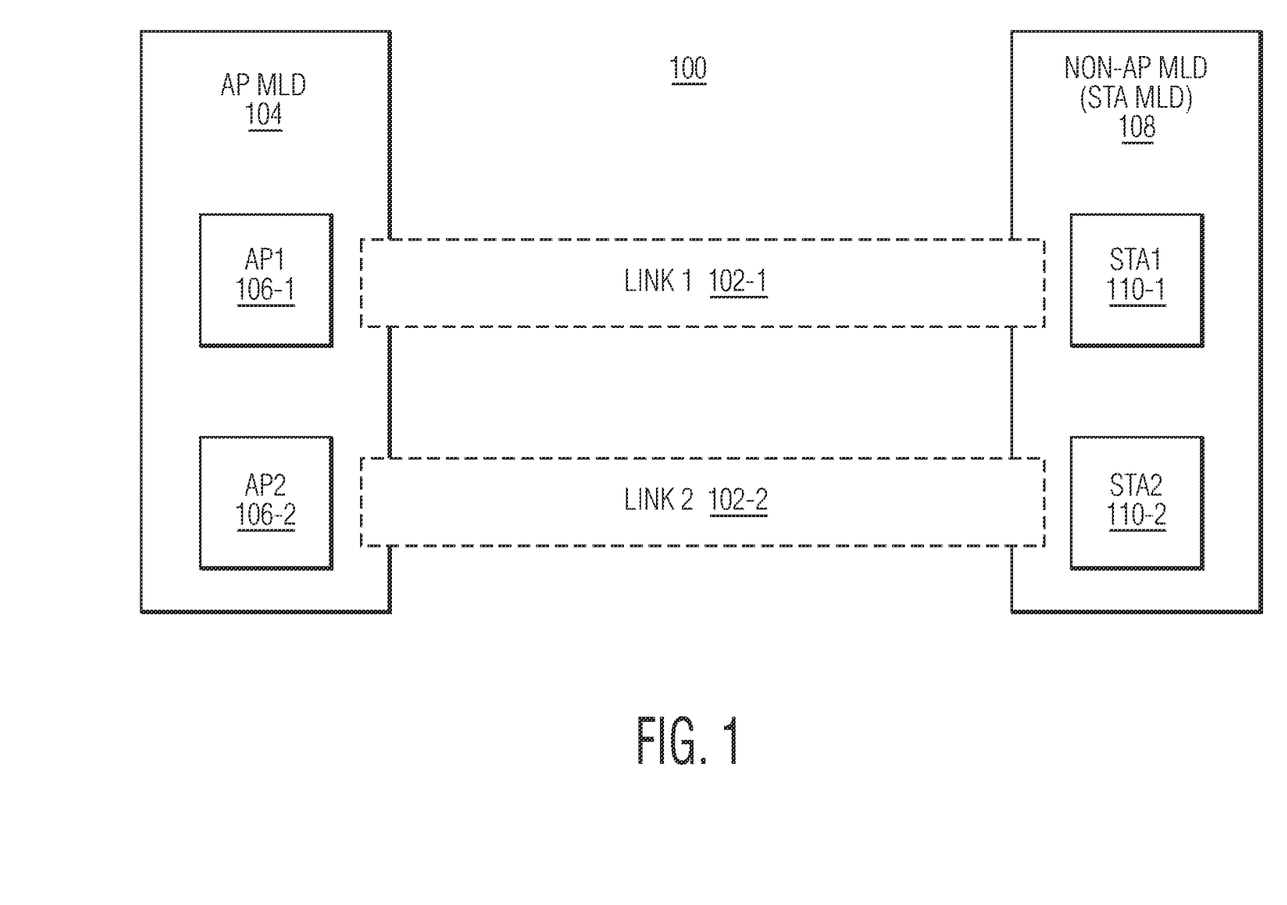
FIG. 1 depicts a multi-link communications system.

FIG. 1 depicts a multi-link communications system 100 that is used for wireless (e.g., WiFi) communications. In the embodiment depicted in FIG. 1, the multi-link communications system includes one AP MLD, implemented as AP MLD 104, and one non-AP MLD (e.g., STA MLD), implemented as non-AP MLD 108. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, AP1 106-1 and AP2 106-2. In some embodiments, a common part of the AP MLD 104 implements upper layer Media Access Control (MAC) functionalities (e.g., beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol, such that the AP MLD 104 operates according to the IEEE 802.11be communication protocol.

In some embodiments, an AP MLD (e.g., AP MLD 104) connects to a local area network (e.g., a LAN) and/or to a backbone network (e.g., the Internet) through a wired connection and wirelessly connects to wireless non-AP STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented in a device that includes a processor, for example, a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 MHz BSS operating channel at 6 GHz band and AP2 106-2 may operate in a 160 MHz BSS operating channel at 5 GHz band. Although the AP MLD 104 is shown in FIG. 1 as including two APs, other embodiments of the AP MLD 104 may include more than two APs.

In the embodiment depicted in FIG. 1, the non-AP MLD, implemented as non-AP MLD 108, includes two radios (e.g., non-AP STAs), STA1 110-1 and STA2 110-2. The non-AP STAs 110-1 and 110-2 may be implemented in hardware (e.g., circuits), software, firmware, or a combination thereof. The non-AP STAs 110-1 and 110-2 may be fully or partially implemented as an IC device. In some embodiments, the non-AP STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the non-AP STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the non-AP STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link 1 102-1 and link 2 102-2. For example, each of the non-AP STAs 110-1 or 110-2 communicates with AP1 106-1 or AP2 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames (e.g., Physical Layer Convergence Protocol (PLCP) Protocol Data Units (PPDUs), beacon frames, probe response frames, (re)association response frames management frames, etc.) between an AP MLD and a non-AP MLD. In some embodiments, a 20 MHz channel may be a punctured 20 MHz channel or an unpunctured 20 MHz channel. Although the non-AP MLD 108 is shown in FIG. 1 as including two non-AP STAs, other embodiments of the non-AP MLD 108 may include one non-AP STA or more than two non-AP STAs. In addition, although the AP MLD 104 communicates (e.g., wirelessly communicates) with the non-AP MLD 108 via links 102-1 and 102-2, in other embodiments, the AP MLD 104 may communicate (e.g., wirelessly communicate) with the non-AP MLD 108 via more than two communication links.

According to an IEEE 802.11TGbe specification, information related to one link (e.g., link 1 102-1) may be transmitted by an AP MLD (e.g., AP MLD 104) via a management frame (e.g., beacon frame, probe response frame, (re)association response frame, etc.) on another link (e.g., link 2 102-2). For example, AP2 106-2 of the AP MLD 104 can transmit information related to link 1 102-1 via a management frame on link 2 102-2. In an embodiment, a non-AP MLD (e.g., non-AP MLD 108) that is associated with the AP MLD may maintain a record of the most recently received change sequence number for each AP of the AP MLD, such that the change sequence number for each AP may be included in a management frame. The change sequence number allows the non-AP MLD to be aware of various events and/or updates that may have occurred on a link, at the AP MLD, or at an AP of the AP MLD. An example of a management frame which may include and/or be used to indicate such events and/or updates is described in further detail with reference to FIG. 2.

Figure 2:
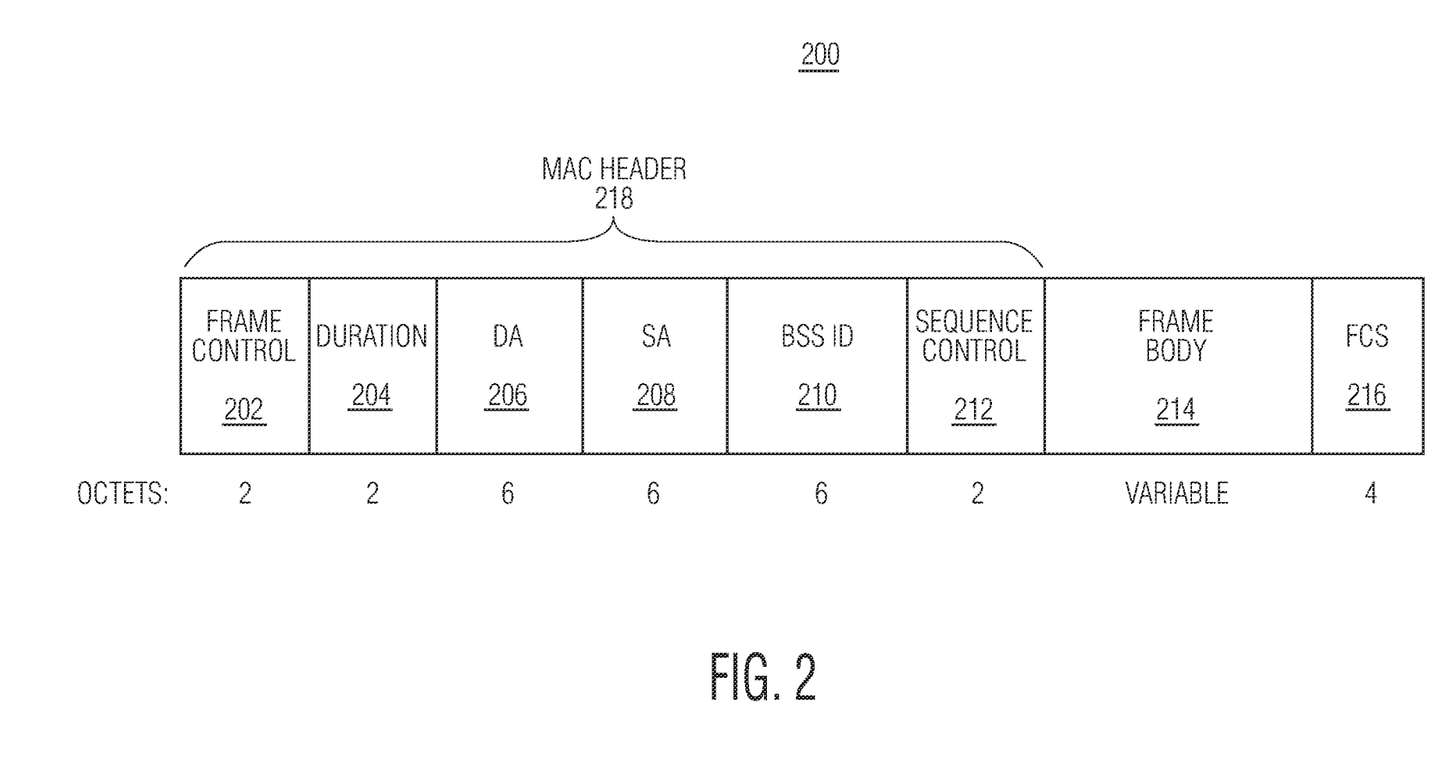
FIG. 2 depicts an example of fields included in a management frame.

FIG. 2 depicts an example of fields included in a management frame 200. The management frame 200 includes eight fields, a Frame Control field 202 (two octets), a Duration field 204 (two octets), a Destination Address (DA) field 206 (six octets), a Source Address (SA) field 208 (six octets), a BSS Identification (ID) field 210 (six octets), a Sequence Control field 212 (two octets), a Frame Body field 214 (variable octets), and a Frame Check Sequence (FCS) field 216 (four octets). Additionally, the management frame 200 includes a MAC header portion 218 that includes the Frame Control field 202, the Duration field 204, the DA field 206, the SA field 208, the BSS ID field 210, and the Sequence Control field 212. In some embodiments, the MAC header portion 218 also includes an HE control field (not shown).

As an example, the management frame 200 may be a beacon frame, a probe response frame, a (re)association response frame, etc. In addition, the management frame 200 may include elements, fields, and/or subfields to communicate information and/or to indicate events for communication devices (e.g., AP MLDs and/or non-AP MLDs). Thus, to allow such communications, the management frame 200 may be transmitted by an AP MLD to a non-AP MLD on a link via an AP of the AP MLD, and received by the non-AP MLD from the AP MLD via a non-AP STA of the non-AP MLD. In an embodiment, the non-AP MLD may operate according to the management frame received on the link, such that operating the non-AP MLD may involve identifying whether a non-AP STA associated with the non-AP MLD need to monitor other management frames transmitted by the AP MLD.

In some embodiments, a to be determined (TBD) field(s) of a management frame (e.g., management frame 200) carries (e.g., includes, indicates, etc.) a Change Sequence value of a transmitting AP and of non-transmitted BSS Identifiers (BSSIDs) (if any). In some embodiments, change sequence information for another AP of an AP MLD may be carried in a subfield included in a Target Beacon Transmission Time (TBTT) Information subfield of a Reduced Neighbor Report (RNR) element corresponding to the other AP. An example of an RNR element and a field that includes a TBTT Information subfield are described in further detail with reference to FIG. 3 and FIG. 4, respectively.

Figure 3:
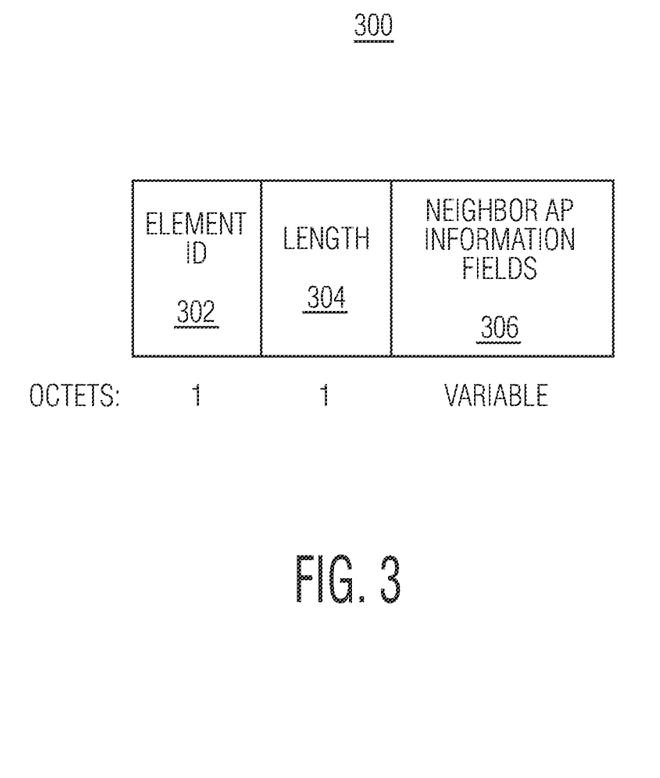
FIG. 3 depicts an example of fields included in a Reduced Neighbor Report (RNR) element.

FIG. 3 depicts an example of fields included in an RNR element 300. In an embodiment, the RNR element 300 may be included in a management frame (e.g., management frame 200) transmitted by an AP MLD to a non-AP MLD. The RNR element 300 includes at least two fields, an Element ID field 302 (one octet), a Length field 304 (one octet), and optional additional field(s), Neighbor AP Information fields 306 (variable octets).

Figure 4:
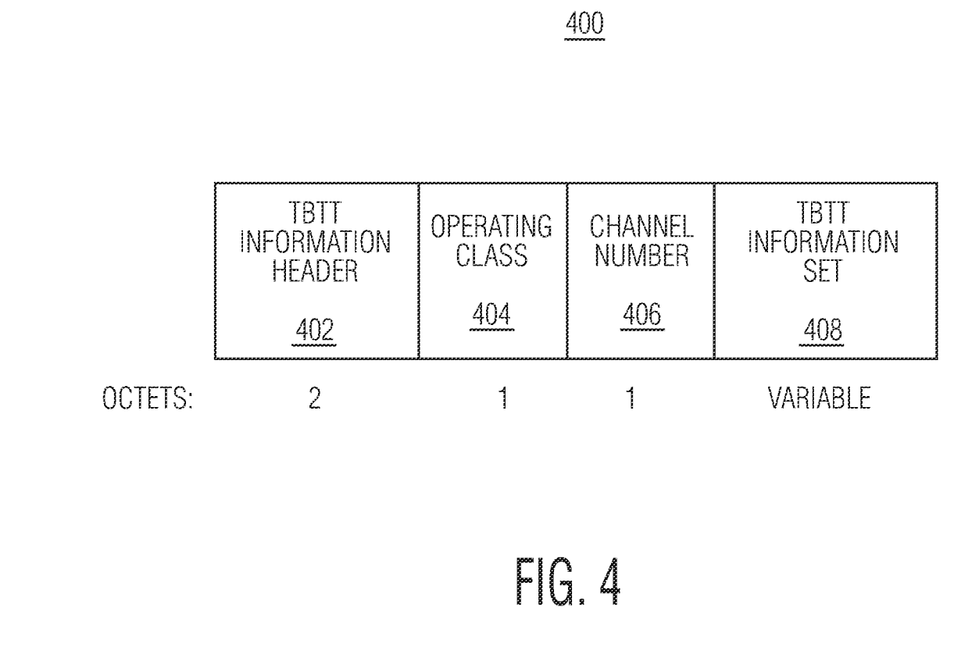
FIG. 4 depicts an example of subfields included in a Neighbor access point (AP) Information field.

FIG. 4 depicts an example of subfields included in a Neighbor AP Information field 400. In an embodiment, the Neighbor AP Information field 400 shown in FIG. 4 may be included in the Neighbor AP Information fields 306 of FIG. 3 which may be further included in a management frame (e.g., management frame 200). The Neighbor AP Information field 400 includes at least three subfields, a TBTT Information Header subfield 402 (two octets), an Operating Class subfield 404 (one octet), a Channel Number subfield 406 (one octet), and an optional additional subfield(s), TBTT Information Set subfield 408 (variable octets).

In some embodiments, a TBD subfield included in a Capability Information field of a management frame provides an early indication of an update to change sequence information included in an RNR element for an AP of an AP MLD. In such an embodiment, for an AP corresponding to a non-transmitted BSSID in a multiple BSSID set, the early indication is carried in a non-transmitted BSSID Capability field (which may have the same structure as the Capability Information field) and signals the update to the change sequence information in the RNR element for APs corresponding to the AP MLD to which the non-transmitted BSSID is affiliated with. In such embodiments, a non-AP MLD that receives the early indication may optionally decode the TBD subfield included in the Capability Information field.

In an embodiment, a management frame (e.g., management frame 200) includes a Change Sequence field that indicates changes of system information for a link (or more than one link), for an AP MLD, and/or for an AP (or more than one AP) of the AP MLD. As an example, the Change Sequence field includes a Change Sequence value that is initially zero, and is incremented when an update event occurs. As described herein, an "update event" may also be referred to as a "critical update event" and may be defined by 11.2.3.15 (Traffic Indication Map (TIM) Broadcast) where additional update events (or critical update events) may be added (if needed). As described herein, "incremented" may imply that a value (e.g., Change Sequence value) is increased by one or that the value is incremented in a modulo operation, unless otherwise explicitly indicated. For example, in the modulo operation, if a Change Sequence value is 255 and a range of the Change Sequence value is [0, 255], and if the Change Sequence value needs to be incremented, the Change Sequence value goes to 0. An example of a Change Sequence field which may be included in a management frame is described in further detail with reference to FIG. 5.

Figure 5:
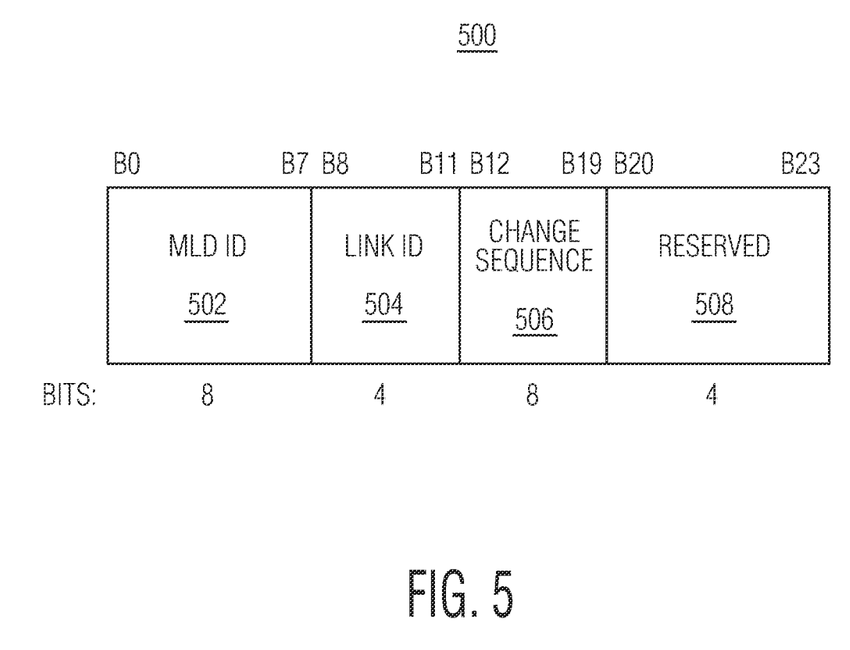
FIG. 5 depicts an example of fields included in a multi-link device (MLD) Parameters subfield of a Target Beacon Transmission Time (TBTT) Information field.

FIG. 5 depicts an example of fields included in an MLD Parameters subfield 500. In an embodiment, the MLD Parameters subfield 500 shown in FIG. 5 may be included in the TBTT Information Set 408 of FIG. 4 which may be further included in a management frame (e.g., management frame 200). The MLD Parameters subfield 500 includes four fields, an MLD ID field 502 that is eight bits (B0 to B7), a Link ID field 504 that is four bits (B8 to B11), a Change Sequence field 506 that is eight bits (B12 to B19), and a Reserved field 508 that is four bits (B20 to B23).

In some embodiments, an update event (or a critical update event) may involve a management frame indicating and/or including a Channel Switch Announcement (CSA) element, an extended CSA (eCSA) element, a Quiet element, a Quiet Channel element, and/or an insertion or a Target Wake Time (TWT) element that includes a restricted access service period (SP), unless otherwise explicitly indicated. Other examples of update events (or critical update events) may involve a management frame indicating and/or including an Enhanced Distribution Channel Access (EDCA) Parameter Set element, a multi-user (MU) EDCA Parameter Set element, and/or an Operation element (e.g., a High-Throughput (HT) Operation element, a VHT Operation element, an HE Operation element, and/or an EHT Operation element). In an embodiment, a field that indicates the update event (or the critical update event) has a length of at most one octet, and a Change Sequence value carried in the field may be modulo of a maximum value.

In some embodiments, if a first AP of an AP MLD is performing a CSA (or an eCSA) operation and includes a CSA element (or an eCSA element) and a Max Channel Switch Time element (if present) in a management frame, then other APs (e.g., a second AP) may include the CSA element (or the eCSA element) and the Max Channel Switch Time element in a per-STA profile sub-element corresponding to the first AP in a multi-link (ML) element included in a management frame transmitted by the second AP (or that a transmitted BSSID in the same multiple BSSID set as the other AP transmits if the other AP is a non-transmitted BSSID). In some embodiments, a channel switch count field may be applied in reference to a TBTT of the first AP and not in reference to a TBTT of the second AP (of the same AP MLD), and the TBTT of the first AP may already be included in an RNR element. In such embodiments, the CSA element (or the eCSA element) and/or the Max Channel Switch Time element may be included in management frames transmitted on each link of the AP MLD, starting when the CSA element (or the eCSA element) and/or the Max Channel Switch Time element are included in management frames of the first AP, and ending at an intended channel switch time.

In some embodiments, when a first AP of an AP MLD is switching from an initial operating channel/class to a target operating channel/class at a target switch time using an eCSA announcement, then any other AP (e.g., a second AP) of the AP MLD may populate fields corresponding to the first AP that is reported in an RNR element of the management frames transmitted by the second AP (or that the transmitted BSSID in the same Multiple BSSID set as the second AP transmits if the other AP is a non-transmitted BSSID) before or after the target switch time to the initial or target operating channel/class.

In some embodiments, if a first AP of an AP MLD includes a Quiet element in a management frame (e.g., beacon frame), then each of the other APs of the AP MLD (e.g., a second AP) include the Quiet element in a per-STA profile sub-element for the first AP. In such an embodiment, the Quiet element is in an ML element included in the management frame. In such an embodiment, timing fields may be applied in reference to a TBTT and a beacon interval (BI) of the first AP, and not applied in reference to the TBTT and the BI of the other APs of the AP MLD.

In some embodiments, if a first AP of an AP MLD is switching from an initial operating channel/class to a target operating channel/class at a target switch time using a CSA element (or an eCSA element) (and a Max Channel Switch Time element), and another AP of the AP MLD (e.g., a second AP) received a (re)association request to perform an ML setup with the first AP at a requested link, then operations described herein may be implemented.

In one embodiment, the second AP includes the CSA element (or the eCSA element) (and the Max Channel Switch Time element) in a (re)association frame sent in response the (re)association request to indicate a time at which the first AP will start beaconing. In another embodiment, if the (re)association frame is sent between the last beacon on the initial operating channel/class and the first beacon on the target operating channel/class, then the second AP includes the Max Channel Switch Time element (if any) in the (re)association frame to indicate the time at which the first AP will start beaconing. In yet another embodiment, the second AP does not include the Max Channel Switch Time element, the CSA element, and/or the eCSA element in the (re)association response.

In some embodiments, if an AP of an AP MLD includes a CSA element, an eCSA element, a Max Channel Switch Time element, and/or a Quiet element in a management frame, then operations described herein may be implemented.

In an embodiment, another AP of the AP MLD (e.g., a second AP) may need to include the CSA element, the eCSA element, the Max Channel Switch Time element, and/or the Quiet element in a per-STA profile sub-element (correspond-ing to the first AP) in an ML element included in a management frame transmitted by the second AP (or that a transmitted BSSID in the same multiple BSSID set as the other AP transmits if the other AP is a non-transmitted BSSID). In such an embodiment, inclusion of the CSA element, the eCSA element, the Max Channel Switch Time element, and/or the Quiet element may be considered an update event, such that the first AP and/or the other APs (e.g., the second AP) of the AP MLD increment a Change Sequence value and indicate an updated Change Sequence value (for a link) in a Change Sequence field of a management frame transmitted by the AP MLD (e.g., the first AP or the other APs of the AP MLD).

By indicating the updated Change Sequence value in the Change Sequence field for a link, a non-AP STA (e.g., a non-AP STA of a non-AP MLD associated with an AP MLD) that is not listening and/or monitoring management frames on the link may be informed to check management frames on the link and/or to send a probe request frame on the link when an update event has been identified on the link. However, because the CSA element, the eCSA element, the Max Channel Switch Time element, and/or the Quiet element are included in the management frame on the link, and because the element(s) may also be included in an ML element of a management frame on another link, the non-AP STA that is not listening and/or monitoring management frames on the link may not need to switch to the link to receive the management frames. But, as the Change Sequence value is incremented, and as the non-AP STA may not know if another update event has been identified on the link, the non-AP STA may need to switch to the link to check the management frame or send a probe request frame. Consequently, implementing the previously described operations limits the efficiency of multi-link communications by increasing network overhead and increasing power consumption at communication devices (e.g., an AP MLD or a non-AP MLD).

In accordance with an embodiment of the invention, a technique for multi-link communications involves identifying, by an AP MLD, that an update event has occurred on a first link, and transmitting, by the AP MLD, a management frame on a second link, wherein the management frame includes a Change Sequence field and an ML element that indicates the update event. In some embodiments, the technique may be implemented by a communications device (e.g., an AP MLD). For example, a device may include a processor configured to identify that an update event has occurred on a first link of an AP MLD, and transmit a management frame on a second link, where the management frame includes a Change Sequence field and an ML element that indicates the update event. In some embodiments, a non-AP MLD may receive the management frame from the AP MLD on the second link and may operate according to the management frame received on the second link. By identifying that an update event has occurred on one link and indicating the update event via a transmission on another link, multi-link communications may be performed more efficiently, and network overhead may be decreased.

In some embodiments, when an update event occurs on a link of an AP MLD and the update event is indicated in an ML element of a management frame (e.g., a beacon frame or a probe response frame) on other link(s) of the AP MLD, a Change Sequence value included in a Change Sequence field of the management frame is preserved. As described herein, "preserved" may imply that the Change Sequence value is not incremented and/or that the Change Sequence value remains the same and is not increased as a result of an update event being identified.

In some embodiments, an update event may be for a first AP associated with an AP MLD on a first link, and a second AP associated with the AP MLD may preserve a Change Sequence value included in a Change sequence field of a management frame transmitted on the second link. For example, an update event for an AP that is (always) included in a beacon frame transmitted on another link may not be classified as an event for updating a Change Sequence value for an AP that supports multi-link operation. Examples of update events where the Change Sequence value in a Change Sequence field is preserved may include when the ML element includes a CSA element, an eCSA element, a Quiet element, a Quiet Channel element, and/or an insertion of a TWT element that includes a restricted access SP. In such an example, transmitting the management frame on the second link may include incrementing the Change Sequence value included in the Change Sequence field when the ML element includes an EDCA Parameter Set element, an MU EDCA Parameter Set element, and/or an Operation element.

In such embodiments, the update event may still be classified as an update event for the AP that supports multi-link operations when deciding whether to update a Check Beacon field of a TIM frame transmitted by the AP MLD subsequent to the transmission of the management frame. When the update event is identified, a Check Beacon value included in the Check Beacon field of the TIM frame may be updated (e.g., incremented or preserved). Additionally, when the update event is identified, the first AP may not increment the Change Sequence value and other AP(s) (e.g., the second AP) that are associated with the same AP MLD as the first AP may indicate the update event in the ML element of the other AP's management frame. As an example, the update event may be included in a per-STA profile sub-element of the ML element that is included in the other AP's management frame, such that the per-STA profile sub-element corresponds to the first AP. An example of a TIM frame that includes a Check Beacon field is described in further detail with reference to FIG. 6.

Figure 6:
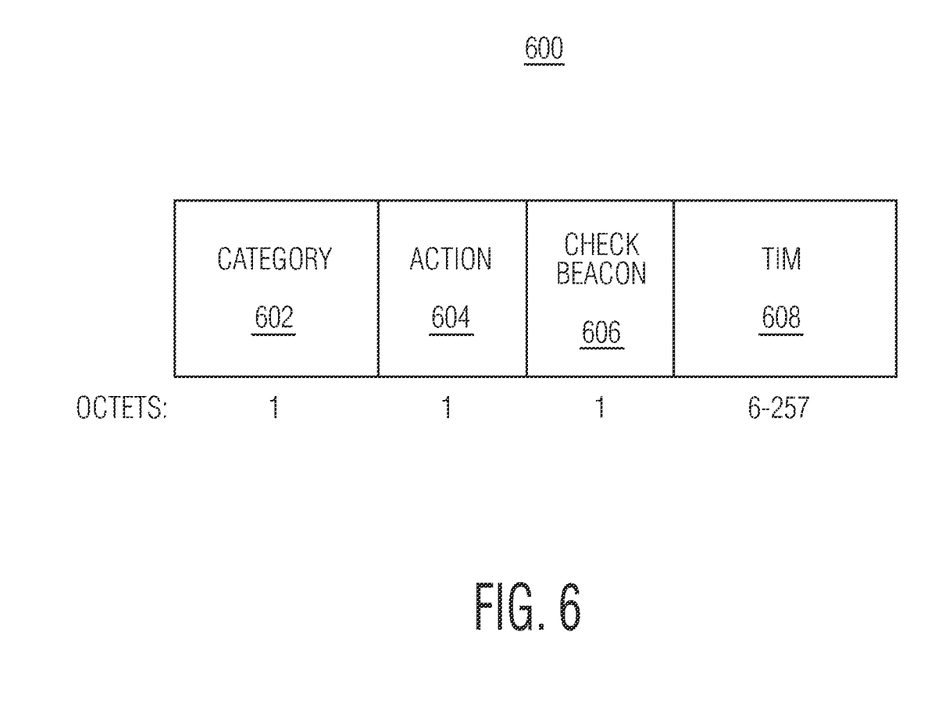
FIG. 6 depicts an example of fields included in a Traffic Indication Map (TIM) frame.

FIG. 6 depicts an example of fields included in a TIM frame 600. In an embodiment, the TIM frame 600 may be transmitted by an AP MLD (e.g., an AP of an AP MLD) to a non-AP MLD (e.g., non-AP STA of a non-AP MLD) subsequent to a transmission of a management frame. The TIM frame 600 includes four fields, a Category field 602 (one octet), an Action field 604 (one octet), a Check Beacon field 606 (one octet), and a TIM field 608 (6-257 octets). In an embodiment, a Check Beacon value included in the Check Beacon field 606 may be incremented or preserved in response to an update event being identified. Additionally, the TIM frame 600 may also include a MAC header portion (not shown).

In some embodiments, an update event may be for a first AP associated with an AP MLD on a first link, such that a Change Sequence value for the first AP may be preserved. For example, when an update event occurs at an AP that is associated with an AP MLD, if the update event is included in a management frame of other AP(s) that are associated with the AP MLD, a Change Sequence value for the first AP may not be incremented.

In such embodiments, the update event may still be classified as an update event for the first AP and a Check Beacon value included in a Check beacon field of a TIM frame transmitted by the AP MLD subsequent to the transmission of the management frame may be updated. When the update event is identified, a Change Sequence value is not updated (e.g., preserved), but the Check Beacon value is updated (e.g., incremented). Additionally, when the update event is identified, the first AP may not increment the Change Sequence value and other AP(s) (e.g., the second AP) that are associated with the same AP MLD as the first AP may indicate the update event in the ML element of the other AP's management frame.

In some embodiments, when an update event occurs on a link of an AP MLD and the update event is indicated in an ML element of a management frame on other link(s) of the AP MLD, a Change Sequence value included in a Change Sequence field of the management frame is incremented. In such an embodiment, a non-AP STA of a non-AP MLD that receives the ML element on the other link(s) may need to identify whether the non-AP STA needs to monitor other management frames transmitted by the AP MLD.

In some embodiments, when a first event that is classified as an update event occurs at a first AP associated with an AP MLD on a first link, and if a management frame of other AP(s) (e.g., a second AP) associated with the AP MLD needs to indicate the update event, then other (subsequent) update events that occur at the first AP are included in the management frames of the other AP(s).

In such embodiments, as the first event and other (subsequent) update events are classified as update events, a Change Sequence value for the first AP is incremented. As an example, when a non-AP MLD receives a management frame (e.g., beacon frame and/or probe response frame) on a first link that includes a Change Sequence field for a first AP operating on second link, where the Change Sequence field includes a Change Sequence value that is greater a Change Sequence value of the non-AP MLD, and where the management frame includes the first event, the non-AP MLD identifies each update event that corresponds to the Change Sequence value from the management frame on the first link. When the first event occurs, other APs (e.g., a second AP) that are associated with the same AP MLD as the first AP include the first event and the other (subsequent) update events in an ML element included in the management frame(s) of the other APs. As an example, the first event and the other (subsequent) update events are included in a per-STA profile sub-element of the ML element included in the management frame(s) of the other AP, such that the per-STA profile sub-element corresponds to the first AP.

In some embodiments, when an event that is classified as an update event occurs at a first AP associated with an AP MLD, and the event is indicated in a management frame of other AP(s) (e.g., a second AP) associated with the AP MLD, a Change Sequence value for the first AP is incremented and an indication is included in the management frame of the other AP(s). In such an embodiment, the indication indicates if another event that is classified as an update event occurs at the first AP.

In such embodiments, a size of the indication may be one bit and the indication may include two states. For example, a first state indicates that there are no other events that occur at a first AP and a second state indicates that there is one or more events that occur at the first AP. The indication may also indicate whether a non-AP STA of a non-AP MLD that receives a management frame from other APs (e.g., a second AP) of an AP MLD needs to check another management frame sent by the first AP. In one embodiment, if the event occurs at the first AP and the management frame of the other APs do not include the event, then the indication may either indicate that there are one or more events that occur at the first AP, or indicate whether the non-AP STA that receives the management frame from the other APs needs to check another management frame sent by the other APs. Furthermore, as the first event is classified as an update event, a Change Sequence value for the first AP is incremented.

According to a standardization of an IEEE 802.11 TGbe communication protocol, a restricted SP may serve low latency traffic in multi-link communications and may be implemented to provide a more predictable latency performance for latency sensitive traffic. In an embodiment, a TWT may be used as the restricted SP. For example, the TWT may enhance channel access for restricted TWT SPs, extend use of broadcast TWT signaling, extend usage of TWT SPs for low latency peer-to-peer communications, and/or introduce support of limiting a restricted TWT flow to Traffic Identifiers (TIDs). Additionally, non-AP STAs may need to end a Transmission Opportunity (TXOP) before the start of the restricted SP(s) to protect resources for low latency traffic, such that non-AP STAs that are not scheduled for the restricted SP are not supposed to access the restricted SP. As the inclusion of a TWT element is considered an update event, if a TWT element that corresponds to a restricted SP is included in a management frame (e.g., beacon frame) of an AP (e.g., first AP) on a link, then a Change Sequence value for the AP will be incremented. Consequently, as the restricted SP is reserved for low latency traffic, the restricted SP may degrade link access performance for the low latency traffic on the link.

Techniques described herein may be implemented to improve operations corresponding to a restricted SP.

In an embodiment, a first AP associated with an AP MLD includes scheduling information for a restricted SP, and a second AP associated the AP MLD transmits the scheduling information for the restricted SP via a management frame on another link (e.g., a second link). For example, if an AP (e.g., a first AP) of an AP MLD includes scheduling information for a restricted SP in a management frame, other APs (e.g., a second AP) of the AP MLD include the scheduling information in their management frames. In such an embodiment, the restricted SP is scheduled using a TWT element (or a (modified) broadcast TWT element), such that the scheduling information for the restricted SP is indicated by the TWT element (or a (modified) broadcast TWT element) which is included in an ML element of management frames. An example of a TWT element and a Broadcast TWT Parameter Set field are described in further detail with reference to FIG. 7 and FIG. 8, respectively.

Figure 7:
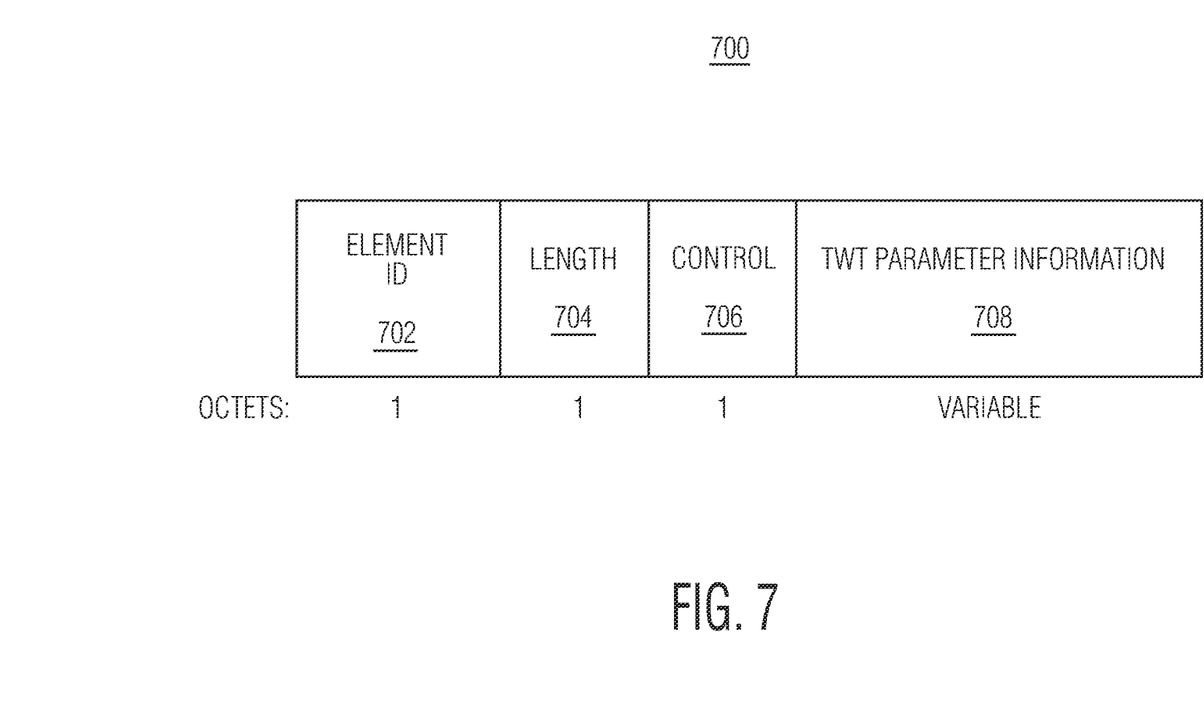
FIG. 7 depicts an example of a Target Wake Time (TWT) element.

FIG. 7 depicts an example of a TWT element 700. In an embodiment, the TWT element 700 may be included in an ML element of a management frame (e.g., a beacon frame or a probe response frame) transmitted by an AP MLD (e.g., an AP of an AP MLD) to a non-AP MLD (e.g., a non-AP STA of a non-AP MLD). The TWT element 700 includes at least three fields, an Element ID field 702 (one octet), a Length field 704 (one octet), a Control field 706 (one octet), and an optional additional field, TWT Parameter Information field 708 (variable octets).

Figure 8:
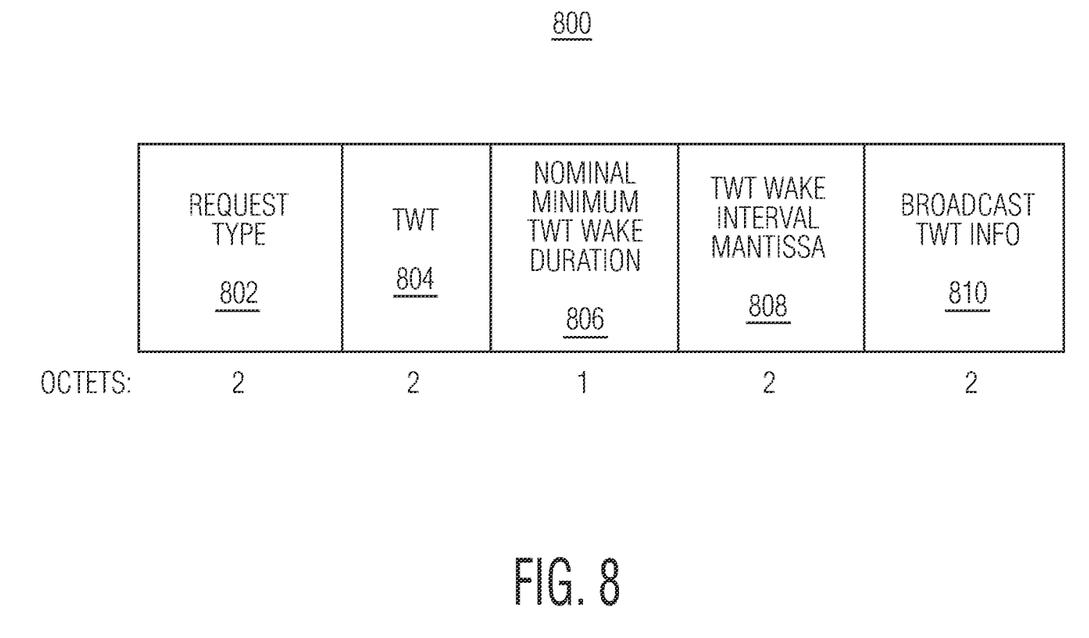
FIG. 8 depicts an example of fields included in a Broadcast TWT Parameter Set.

FIG. 8 depicts an example of subfields included in a Broadcast TWT Parameter Set field 800. In an embodiment, the Broadcast TWT Parameter Set field 800 shown in FIG. 8 may be included in the TWT Parameter Information field 708 of FIG. 7. The Broadcast TWT Parameter Set field 800 includes five subfields, a Request Type subfield 802 (two octets), a TWT subfield 804 (two octets), a Nominal Minimum TWT Wake Duration subfield 806 (one octet), a TWT Wake Interval Mantissa subfield 808 (two octets), and a Broadcast TWT Info subfield 810 (two octets). In an embodiment, the Broadcast TWT Parameter Set field 800 may include scheduling information for one or more APs of an AP MLD.

In an embodiment, when scheduling information is indicated by a first AP of an AP MLD, other APs associated with the same AP MLD may include the scheduling information in an ML element of a management frame. In such an embodiment, the scheduling information may be for non-AP STAs of a non-AP MLD associated with the AP MLD. As an example, a non-AP STA that is not scheduled by the scheduling information ends a TXOP before a restricted SP. As another example, a non-AP STA that is scheduled by the scheduling information ends the TXOP before the restricted SP.

According to a standardization of an IEEE 802.11 TGbe communication protocol, multi-link communications may also implement use of a Quiet element. As an example, a Quiet element indicates a quiet interval during which a non-AP STA (that does not operate according to an EHT communication protocol (e.g., a non-EHT STA)) is not allowed to access a medium (e.g., a channel medium, a link, a band, etc.). In such an example, the Quiet element is included in a beacon frame transmitted by an AP of an AP MLD on a link where a restricted TWT is established. In an embodiment, non-AP STAs operating according to an EHT communication protocol (e.g., EHT non-AP STAs) are allowed to ignore the quiet interval when the quiet interval overlaps with a restricted SP, such that the non-AP STA is therefore allowed to access the medium during the restricted SP. In some embodiments, an AP operating according to an EHT communication protocol (e.g., an EHT AP) may announce quiet intervals with Quiet elements that overlap with restricted SPs via management frames transmitted to non-AP STAs. In such embodiments, support for restricted SPs is optional for EHT non-AP STAs and EHT APs. An example of a Quiet element is described in further detail with reference to FIG. 9.

Figure 9:
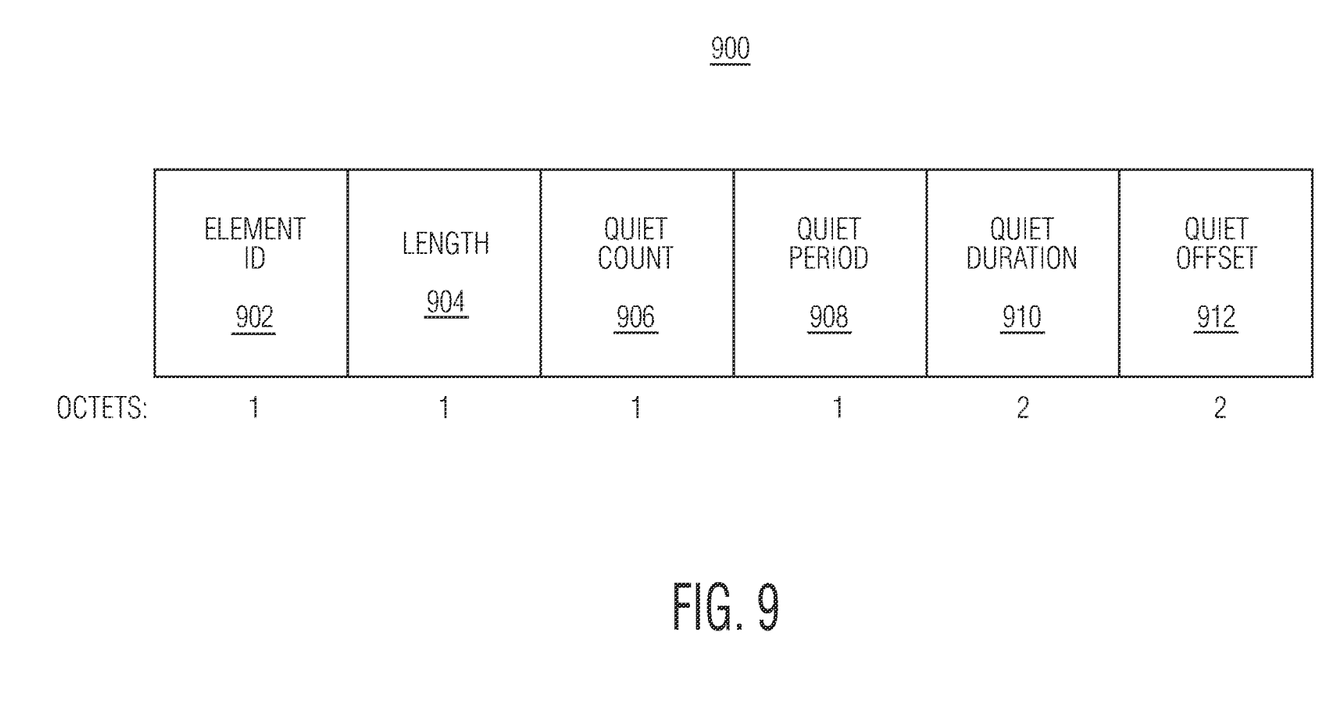
FIG. 9 depicts an example of a Quiet element.

FIG. 9 depicts an example of a Quiet element 900. In an embodiment, the Quiet element 900 may be included in an ML element of a management frame (e.g., a beacon frame or a probe response frame) transmitted by an AP MLD (e.g., an AP of an AP MLD) to a non-AP MLD (e.g., a non-AP STA of a non-AP MLD). The Quiet element 900 includes six fields, an Element ID field 902 (one octet), a Length field 904 (one octet), a Quiet Count field 906 (one octet), a Quiet Period field 908 (one octet), a Quiet Duration field 910 (two octets), and a Quiet Offset field 912 (two octets). In an embodiment, the Quiet element 900 may indicate and/or include information which defines parameters for a quiet interval.

In some embodiments, a Quiet element may be included in a management frame on a first link with scheduling information of a restricted SP for a first AP of an AP MLD. The Quiet element may be used to protect the restricted SP from being accessed by non-AP STAs (of a non-AP MLD associated with the AP MLD) that do not support the restricted SP, such that the scheduling information of the restricted SP may be considered an update event. Because the quiet element is included in the management frame of the first AP on the first link, information included in the Quiet element is also included in a management frame of a second AP (of the same AP MLD) on a second link. Therefore, non-AP MLDs that receive the management frame from the second AP will identify that they may not access the first link, and thus, the non-AP MLDs may not access the restricted SP on the first link.

To improve operations when a Quiet element and a restricted SP are used in multi-link communications, techniques described herein may be implemented by communication devices (e.g., AP MLDs and/or non-AP MLDs).

In an embodiment, a first element is defined, such that the first element may be included in a first set or a second set to indicate different operations. As an example, the first set of the first element(s) indicates a duration during which (all) non-AP STAs have access to a medium. As another example, the second set of the first element(s) indicates a duration during which a first group of non-AP STAs is allowed to access a medium, and during which a second group of non-AP STAs is not allowed to access the medium.

In some embodiments, the first element is included in a management frame transmitted by a first AP of an AP MLD on a first link. In one embodiment, if the first element is from the first set of the first element(s), then a management frame transmitted by a second AP of the AP MLD on a second link may include the first element. In another embodiment, if the first element is from the second set of the first element(s), then the management frame transmitted by the second AP of the AP MLD on the second link may not include the first element.

Examples of the first element, the first set of the first element(s), the second set of the first element(s), the first group of non-AP STAs, and the second group of non-AP STAs are described herein. In some embodiments, the first element is a Quiet element. In an embodiment, the first group of non-AP STAs operate according to an EHT communication protocol (e.g., EHT non-AP STAs) and may support a restricted SP operation. In an embodiment, the second group of non-AP STAs operate according to the EHT communication protocol and may not support the restricted SP operation. In an embodiment, the second set of the first element(s) may include one or more Quiet elements used to protect an SP of one more restricted SPs.

In some embodiments, if the first element included is from the first set of the first element(s) or the second set of the first set of element(s), then a Change Sequence value that corresponds to a first link is not updated unless there is another update event that has occurred, and which is included in a management frame of the first AP. In one embodiment, if the first element included is from the first set of the first element(s), then an event may not be considered an update event. In another embodiment, if the first element included is from the second set of the first element(s), then an event may or may not be considered an update event. In yet another embodiment, if the first element included is from the second set of the first element(s), then a management frame of a second AP of an AP MLD may further include the first element and scheduling information of a restricted SP.

Throughout the disclosure a management frame, e.g., a beacon frame or a probe response frame, was described as having the ability to carry or include information of other links. However, the management frame that delivers the information of other links may not be limited to beacon frames or probe response frames. For example, other types of management frames may be used to carry or include information of other links. In addition, the information of other links can be transmitted more than once by being included in two or more management frames which may be transmitted at the same time or at different times. For example, information may be included in multiple beacon frames (until the next Delivery TIM (DTIM) beacon frame), such that non-AP STAs in a power save state may be able to awake and receive the information.

Figure 10:
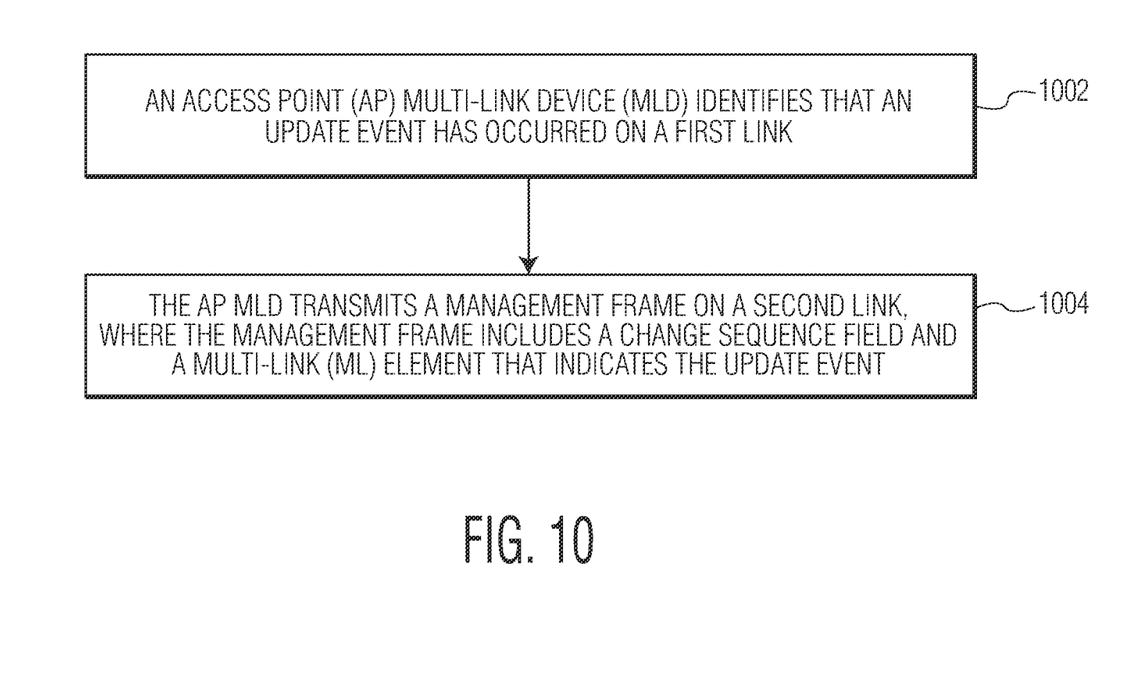
FIG. 10 illustrates a flow diagram of a technique for multi-link communications in accordance with an embodiment of the invention.

FIG. 10 illustrates a flow diagram of a technique for multi-link communications in accordance with an embodiment of the invention. At block 1002, an AP MLD identifies that an update event has occurred on a first link. At block 1004, the AP MLD transmits a management frame on a second link, where the management frame includes a Change Sequence field and an ML element that indicates the update event.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a processor configured to:
identify that a critical update event has occurred on a first link of an access point (AP) multi-link device (MLD); and
transmit a management frame on a second link,
wherein the management frame includes a Change Sequence field and a multi-link (ML) element that indicates the critical update event;
wherein the processor is configured to set the Change Sequence field to a Change Sequence value before the critical update event; and
wherein the processor is configured to keep the Change Sequence field set to the Change Sequence value after the critical update event.

2. The device of claim 1,
wherein the processor is configured to a not increment the Change Sequence value included in the Change Sequence field during transmission of the management frame when the ML element includes at least one of:

a Channel Switch Announcement (CSA) element;
an extended CSA (eCSA) element;
a Quiet element; and
a Quiet Channel element.

3. The device of claim 2,
wherein the processor is configured to increment a Check Beacon value included in a Check Beacon field of a Traffic Indication Map (TIM) frame transmitted by the AP MLD subsequent to the transmission of the management frame.

4. The device of claim 1,
wherein the processor is configured to increment a Change Sequence value included in the Change Sequence field during transmission of the management frame when the ML element includes at least one of:
an Enhanced Distribution Channel Access (EDCA) Parameter Set element;
a multi-user (MU) EDCA Parameter Set element; and
an Operation element.

5. The device of claim 1,
wherein the critical update event is for a first AP associated with the AP MLD on the first link, and
wherein a second AP associated the AP MLD is configured to not increment the Change Sequence value included in the Change Sequence field of the management frame transmitted on the second link.

6. The device of claim 1,
wherein the critical update event is for a first AP associated with the AP MLD on the first link, and
wherein the Change Sequence value for the first AP remains unchanged.

7. The device of claim 1,
wherein a first AP associated with the AP MLD includes scheduling information for a restricted Service Period (SP), and wherein a second AP associated the AP MLD transmits the scheduling information for the restricted SP via the management frame on the second link.

8. The device of claim 7,
wherein the scheduling information for the restricted SP is indicated by a TWT element included in the ML element of the management frame.

9. The device of claim 7,
wherein the scheduling information is for non-AP stations (STAs) of a non-AP MLD associated with the AP MLD, and
wherein a non-AP STA that is not scheduled by the scheduling information ends a Transmission Opportunity (TXOP) before the restricted SP.

10. The device of claim 7,
wherein the scheduling information is for non-AP STAs of a non-AP MLD associated with the AP MLD, and
wherein a non-AP STA that is scheduled by the scheduling information ends a TXOP before the restricted SP.

11. The device of claim 1,
wherein the ML element includes a Quiet element that indicates a quiet interval during which a non-AP STA is not allowed to access a medium.

12. The device of claim 11, wherein the non-AP STA ignores the quiet interval when the quiet interval overlaps with a restricted Service Period (SP), and wherein the non-AP STA is allowed to access the medium during the restricted SP.

13. The device of claim 1,
wherein a first AP associated with the AP MLD on the first link identifies the update event, and
wherein a second AP associated the AP MLD transmits the management frame on the second link.

14. The device of claim 1,
wherein the update event is included in a per-STA profile sub-element of the ML element, and
wherein the per-STA profile sub-element corresponds to an AP of the AP MLD.

15. The device of claim 1,
wherein the management frame is at least one of a beacon frame and a probe response frame.

16. The device of claim 1,
wherein the processor is configured to operate according to an Institute of Electrical and Electronics Engineers (IEEE) 802.11be communication protocol.

17. The device of claim 1,
wherein the device is a wireless local area network (WLAN) device.

18. A method for multi-link communications, the method comprising:
identifying, by an access point (AP) multi-link device (MLD), that a critical update event has occurred on a first link;
transmitting, by the AP MLD, a management frame on a second link,
wherein the management frame includes a Change Sequence field and a multi-link (ML) element that indicates the critical update event;
wherein the Change Sequence field includes a Change Sequence value; and
after the critical update event, keeping the Change Sequence value same as from before the critical update event.

19. The method of claim 18, wherein the method includes:
receiving, by a non-AP MLD from the AP MLD, the management frame on the second link; and
operating the non-AP MLD according to the management frame received on the second link.

20. The method of claim 19, wherein operating the non-AP MLD includes:
identifying whether a non-AP station (STA) associated with the non-AP MLD needs to monitor other management frames transmitted by the AP MLD.

21. A device comprising: a processor configured to: identify that an update event has occurred on a first link of an access point (AP) multi-link device (MLD); and transmit a management frame on a second link, wherein the management frame includes a Change Sequence field and a multi-link (ML) element that indicates the update event; wherein the ML element includes a Quiet element that indicates a quiet interval during which a non-AP STA is not allowed to access a medium; wherein the non-AP STA ignores the quiet interval when the quiet interval overlaps with a restricted Service Period (SP), and wherein the non-AP STA is allowed to access the medium during the restricted SP.

* * * * *